US008780076B2

(12) United States Patent
Ramarao et al.

(10) Patent No.: US 8,780,076 B2
(45) Date of Patent: Jul. 15, 2014

(54) MOBILE TERMINAL AND METHOD FOR CONTROLLING THE SAME

(75) Inventors: Prasanna Banavara Ramarao, Bangalore (IN); Jonghwan Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 362 days.

(21) Appl. No.: 13/222,081

(22) Filed: Aug. 31, 2011

(65) Prior Publication Data

US 2011/0310048 A1    Dec. 22, 2011

(30) Foreign Application Priority Data

Feb. 17, 2011    (KR) .................. 10-2011-0014287

(51) Int. Cl.
*G06F 3/045* (2006.01)
(52) U.S. Cl.
USPC ..................... 345/174; 345/175; 345/176
(58) Field of Classification Search
USPC ............ 345/169, 173–179; 178/18.01–18.09, 178/20.01–20.04; 455/414.1, 566; 715/702, 715/836–860
See application file for complete search history.

(56) References Cited

U.S. PATENT DOCUMENTS

| 6,331,852 | B1 * | 12/2001 | Gould et al. ............. 345/419 |
| 7,134,095 | B1 * | 11/2006 | Smith et al. ............. 715/860 |
| 7,216,305 | B1 * | 5/2007 | Jaeger .................... 715/849 |
| 8,286,098 | B2 * | 10/2012 | Ju et al. .................. 715/849 |
| 2003/0112279 | A1 * | 6/2003 | Irimajiri ................ 345/810 |
| 2006/0020898 | A1 * | 1/2006 | Kim et al. .............. 715/764 |
| 2007/0124699 | A1 * | 5/2007 | Michaels ............... 715/837 |
| 2007/0157089 | A1 * | 7/2007 | Van Os et al. .......... 715/702 |
| 2010/0031202 | A1 * | 2/2010 | Morris et al. .......... 715/863 |
| 2010/0093400 | A1 * | 4/2010 | Ju et al. .................. 455/566 |

* cited by examiner

*Primary Examiner* — Vijay Shankar
(74) *Attorney, Agent, or Firm* — KED & Associates LLP

(57) ABSTRACT

Disclosed is a mobile terminal and a method for controlling the same. The mobile terminal includes a body having a wireless communication module, a display unit disposed on one surface of the body, displaying one or more icons thereon, and configured to have a touch input thereon, and a controller configured to compensate for a control command corresponding to a touch, based on at least one of a touch duration, a touch point and a change of the touch point, when the touch on the display unit is detected during a change of a position or a shape of the icon.

20 Claims, 12 Drawing Sheets

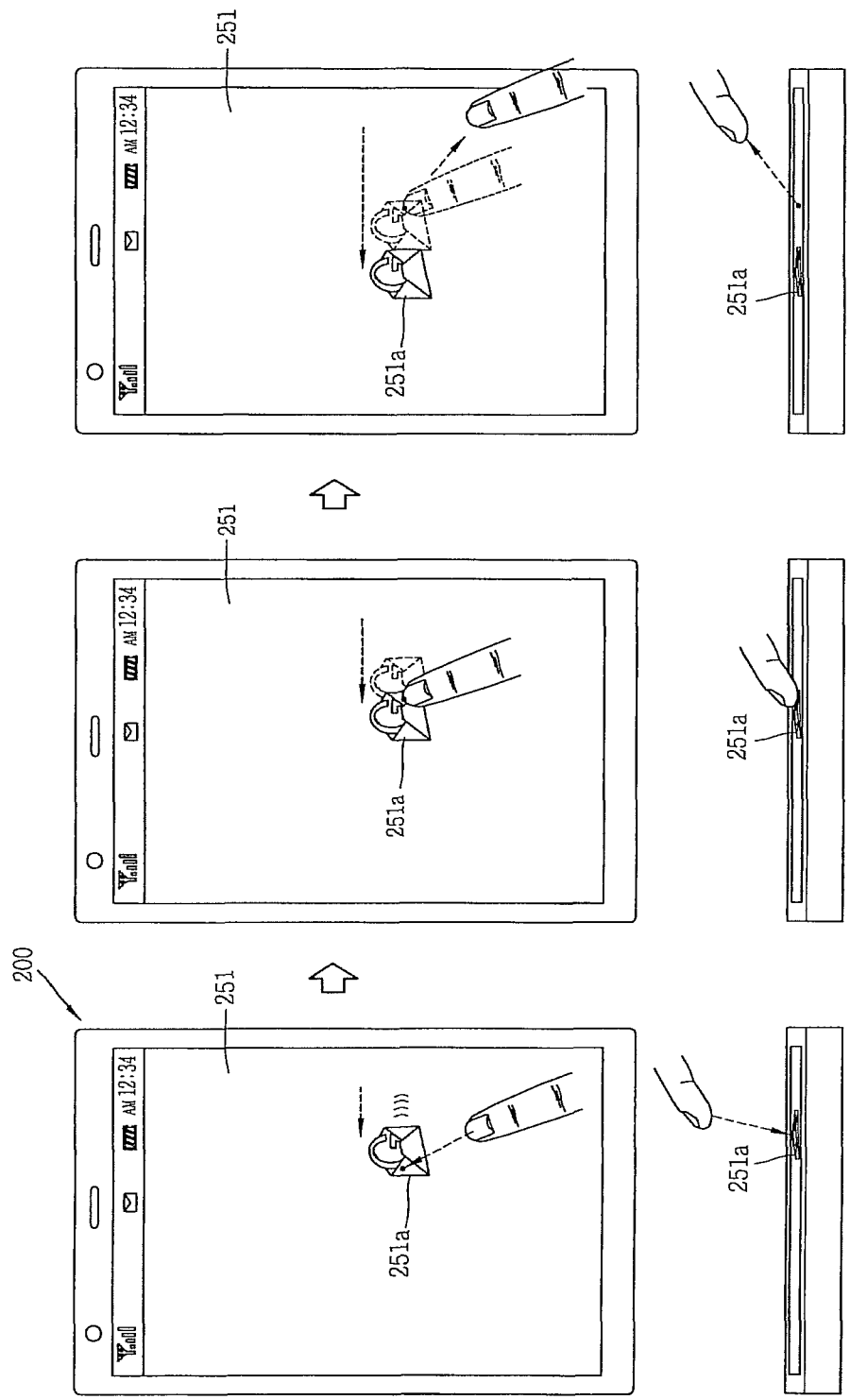

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2011-0014287, filed on Feb. 17, 2011, the contents of which is incorporated by reference herein in its entirety.

BACKGROUND OF THE INVENTION

1. Field of the Invention

This specification relates to a mobile terminal having a touch input function, and a method for controlling the same.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

The conventional mobile terminal has been developed to provide more functions to a user, and to have a design for enhancing portability. As a result, a mobile terminal having a touch input function is being spotlighted. According to this recent trend, may be considered a method for controlling a mobile terminal capable of precisely sensing a touch input and controlling a mobile terminal.

SUMMARY OF THE INVENTION

Therefore, an aspect of the detailed description is to provide a mobile terminal capable of precisely sensing a touch input while objects displayed on a display unit are moving, and a method for controlling the same.

Another aspect of the detailed description is to provide a mobile terminal capable of having a new compensation method for facilitation of a touch input.

To achieve these and other advantages and in accordance with the purpose of this specification, as embodied and broadly described herein, a mobile terminal includes a body having a wireless communication module, a display unit disposed on one surface of the body, displaying one or more icons thereon, and configured to have a touch input thereon, and a controller configured to compensate for a control command corresponding to a touch, based on at least one of a touch duration, a touch point and a change of the touch point when the touch on the display unit is detected during a change of a position or a shape of the icon.

The icon may be an icon of a stereoscopic image, and the control command corresponding to the touch may include selection for the icon of the stereoscopic image itself, and selection for a part of the icon of the stereoscopic image.

According to one example of the present invention, the mobile terminal may include a sensing unit mounted to the body, and configured to detect a relative position of a user's reference portion with respect to the display unit. The change of the position or the shape of the icon may correspond to a change of the relative position. The sensing unit may be configured to detect a movement of the reference portion based on the body, or to detect tilting of the body based on the reference portion.

According to another example of the present invention, the control command may be compensated when the touch duration is less than a preset time, but may not be compensated when the touch duration is more than the preset time.

Upon detection of a drag operation consecutive with the touch, the controller may determine the operation as selection for an icon adjacent to a touch point in a drag direction. On the display unit, may be highlighted an icon to be selected by the touch for a touch duration.

When the icon exists on the touch point for a touch duration, the controller may determine the touch as selection for the icon. On the other hand, when the icon does not exist on the touch point, the controller may determine the touch as selection for an icon adjacent to the touch point.

To achieve these and other advantages and in accordance with the purpose of this specification, as embodied and broadly described herein, a method for controlling a mobile terminal which implements a touch input on a display unit, the method includes displaying, on the display unit, a plurality of objects selectable by touch, changing positions or shapes of the objects, and when a touch on the display unit is detected during changes of the positions or the shapes of the objects, determining which object among the objects is selected in correspondence to the touch. The objects may be icons of stereoscopic images, or may be parts of the icons.

According to one example of the control method, in the step of determination, upon detection of a drag operation consecutive with the touch, the operation may be determined as selection for an object adjacent to a touch point in a drag direction among the objects. Alternatively, when a touch duration exceeds a preset reference value, the touch may be determined as selection for an object positioned at a touch point on the display unit.

According to another example of the control method, in the step of changing, a relative position of a user's reference portion with respect to the display unit may be detected. And, the positions or the shapes of the objects may be changed according to a change of the relative position.

According to another embodiment of the present invention, a method for controlling a mobile terminal which implements a touch input on a display unit, the method includes sensing a relative position of a user's reference portion with respect to the display unit, sensing a change of the relative position while touch on the display unit is maintained, and compensating for a control command corresponding to the touch based on the change of the relative position.

According to one example of the control method, in the step of detection, a movement of the reference portion may be detected based on the mobile terminal, or tilting of the mobile terminal may be detected based on the reference portion. On the display unit, may be displayed a plurality of icons selectable by the touch. Positions or shapes of the icons may be changed according to a movement of the reference portion.

According to another example of the control method, in the step of compensating, a control command corresponding to the touch may be compensated based on the change of the relative position and the touch duration. When the change of the relative position is detected and the touch duration is less than a preset time, the control command is not processed. On the other hand, when the change of the relative position is detected and the touch duration is more than the preset time, the control command is processed.

According to still another example of the control method, in the step of compensating, when no icon exists on a touch point of the display unit for the touch duration, the touch may be determined as selection for an icon adjacent to the touch point.

The step of compensating may include, when no icon exists on a touch point of the display unit for the touch duration, highlighting an icon adjacent to the touch point, and determining whether the adjacent icon is selected or not based on information relating to touch release with respect to the touch point.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a conceptual view illustrating one operation example of a mobile terminal according to the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), a navigation system, etc.

Figure 1:
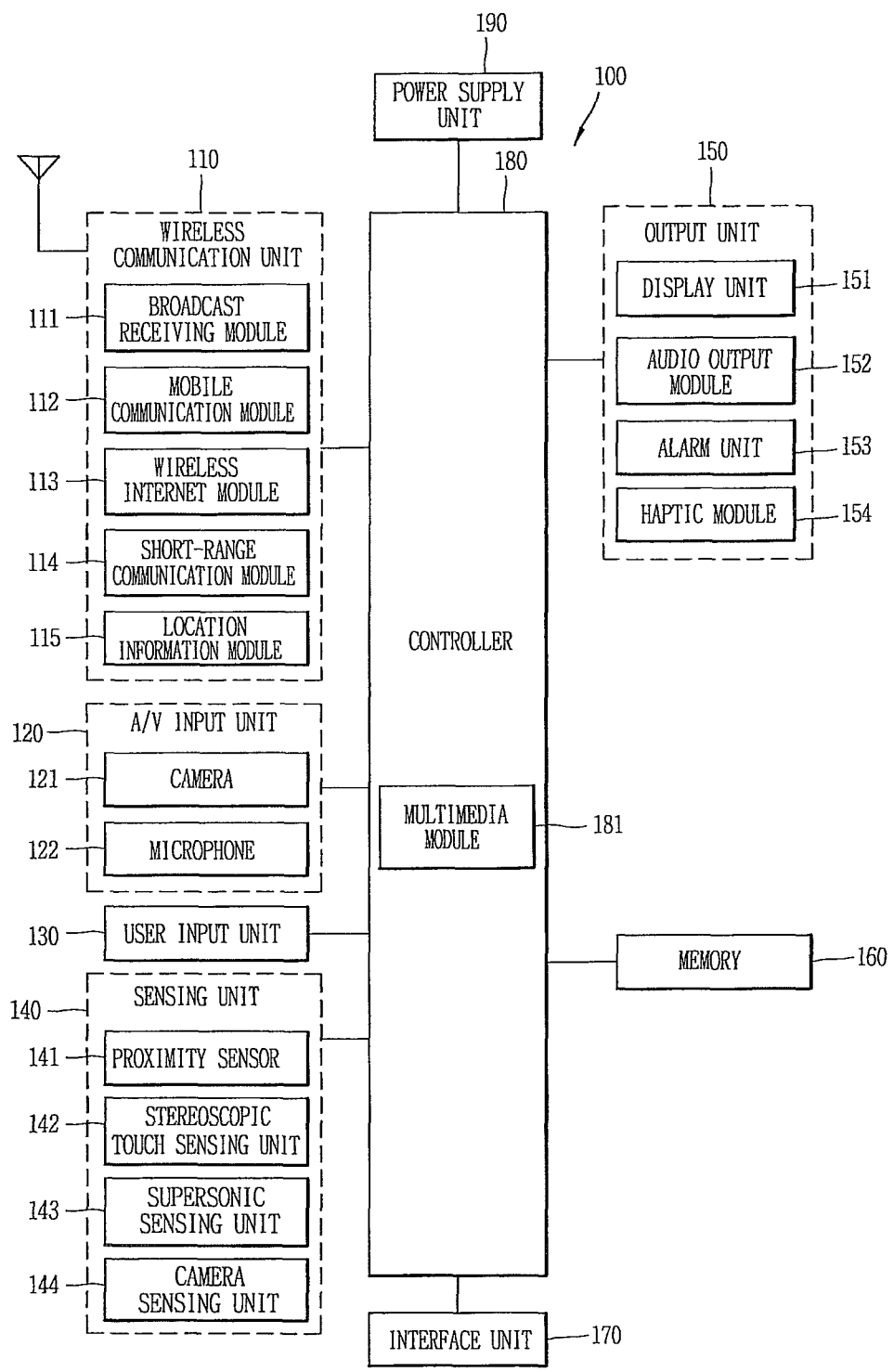
FIG. 1 is a block diagram of a mobile terminal according to one embodiment of the present invention.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel. The broadcast associated information may indicate information relating to a broadcasting channel, a broadcasting program or a broadcasting service provider. The broadcast associated information may be provided through a mobile communication network. In this case, the broadcast associated information may be received via the mobile communication module 112. Broadcasting signals and/or broadcasting associated information may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like. When the touch pad has a layered structure with a display unit 151 to be later explained, this may be referred to as a 'touch screen'.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the is mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device and the like. Moreover, the sensing unit 140 may include a proximity sensor 141, which will be later explained in relation to a touch screen.

The output unit 150 is configured to output an audio signal, a video signal or an alarm signal. The output unit 150 may include a display unit 151, an audio output module 152, an alarm 153, a haptic module 154, and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may include at least one of a Liquid Crystal Display (LCD), a Thin Film Transistor-Liquid Crystal Display (TFT-LCD), an Organic Light-Emitting Diode (OLED), a flexible display and a three-dimensional (3D) display.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

The display unit 151 may be implemented as a stereoscopic display unit for displaying a stereoscopic image.

A left image and a right image required to implement a 3D stereoscopic image may be displayed on the stereoscopic display unit by a stereoscopic processor (not shown). The stereoscopic processor may be configured to extract right and left images from a received 3D image, or configured to convert a received 2D image into right and left images.

When the stereoscopic display unit and the touch sensor has a layered structure, this may be referred to as 'stereoscopic touch screen'. When the stereoscopic display unit is combined with a 3D sensor for sensing a touch operation, the stereoscopic display unit may be also used as a 3D input device.

As an example of the 3D sensor, the sensing unit 140 may include a proximity sensor 141, a stereoscopic touch sensing unit 142, a supersonic sensing unit 143 and a camera sensing unit 144.

The proximity sensor 141 measures a distance between an object to be detected and a detection surface by using strength of an electromagnetic field or infrared rays. Here, the an object to be detected may be a user's finger or a stylus pen. The mobile terminal recognizes a touched part of a stereoscopic image based on the measured distance. When a touch screen is a capacitive type, an approaching degree of the object to be detected is measured according to a change of an electromagnetic field. Based on this approaching degree, touch in three dimensions may be recognized.

The stereoscopic touch sensing unit 142 is configured to detect intensity (strength) or duration of touch applied onto a touch screen. For instance, the stereoscopic touch sensing unit 142 detects a touch pressure. If the touch pressure is high, the stereoscopic touch sensing unit 142 recognizes the touch as touch on the mobile terminal with respect to an object relatively-farther from a touch screen.

The supersonic sensing unit 143 is configured to recognize position information of an object to be detected, by using ultrasonic waves.

The supersonic sensing unit 143 may consist of an optical sensor and a plurality of supersonic sensors. The optical sensor is configured to sense light. For instance, the light may be infrared rays, and the optical sensor may be an infrared data association (IRDA).

The supersonic sensor is configured to sense ultrasonic waves. The plurality of supersonic sensors are arranged so as to be spacing from each other. Accordingly, the supersonic sensors have a time difference in sensing ultrasonic waves generated from the same point or neighboring points.

Ultrasonic waves and light are generated from a wave generation source. This wave generation source is provided at an object to be detected, e.g., a stylus pen. Since light is much faster than ultrasonic waves, time for the light to reach an optical sensor is much shorter than time for the ultrasonic waves to reach supersonic sensors. Accordingly, a position of the wave generation source may be obtained by using a difference of time for the ultrasonic waves to reach with respect to time for the light to reach.

Time for the ultrasonic waves generated from the wave generation source to reach the plurality of supersonic sensors is different from each other. Once a stylus pen moves, the time difference is changed. Accordingly, position information may be calculated according to a moving path of the stylus pen. However, the supersonic sensing unit is not limited to a method for emitting ultrasonic waves from the stylus pen. For instance, the supersonic sensing unit may be applied to a method for generating ultrasonic waves from the mobile terminal, and sensing ultrasonic waves reflected from an object to be detected.

The camera sensing unit 144 includes at least one of a camera, a photo sensor and a laser sensor.

As one example, the camera and the laser sensor are combined with each other, thereby sensing touch of an object to be detected with respect to a 3D stereoscopic image. By adding distance information detected by the laser sensor to a 2D image captured by the camera, 3D information may be obtained.

As another example, the photo sensor may be laminated on a display device. The photo sensor is configured to scan a movement of an object to be detected, the object adjacent to the touch screen. More concretely, the photo sensor is mounted with a photo diode and a transistor (TR) in directions of rows and columns, and scans an object placed thereon based on an electrical signal changed according to the amount of light applied to the photo diode. That is, the photo sensor calculates a coordinate value of an object to be detected according to a change amount of light, thereby acquiring position information of the object to be detected.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 (or other type of user notification devices) may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like.

The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input with respect to the mobile terminal.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a terminal body with the user's thumb and index fingers. The one function, for example, may be activating or deactivating of the display unit 151 or the touch pad.

Hereinafter, embodiments of a method for controlling the mobile terminal will be explained in more details with reference to the attached drawings. The following embodiments may be implemented independently or by being combined with each other. Alternatively, the following embodiments may be implemented by being combined with the aforementioned user interface (UI).

Hereinafter, will be explained processing a touch input and a control command with respect to the mobile terminal 100 according to the present invention in a case that a user is in a fixed state, and in a case that a user is in a moving state. Firstly, processing a user's input when a case that a user is in a fixed state will be explained.

FIG. 2 is a conceptual view illustrating one operation example of a mobile terminal according to the present invention.

Referring to FIG. 2, the mobile terminal 200 is provided with a display unit 251 disposed on one surface, e.g., a front surface thereof. The display unit 251 is configured to have a touch input thereon. The display unit 251 displays one or more icons 251a and 251b thereon, and the icons 251a and 251b are displayed such that positions or shapes thereof are changed.

FIG. 2 is a view illustrating a position change of the icon 251a according to time. For instance, the icon 251a is moved from the left to the right. The dotted lines relating to a user's finger indicate directions to approach to or be spacing from the display unit 251. If the icon 251 touched by a user for selection may be deviated from a touch point when the user's finger touching on the icon 251a releases the touch.

Once touch on the display unit 251 is detected while a position or a shape of the icon is changed, the controller 180 (refer to FIG. 1) of the mobile terminal 200 compensates for a control command corresponding to the touch so as to recognize a user's selection more precisely. In this case, the control command may be compensated based on at least one of a touch duration, a touch point and a change of the touch point.

Figure 3A:
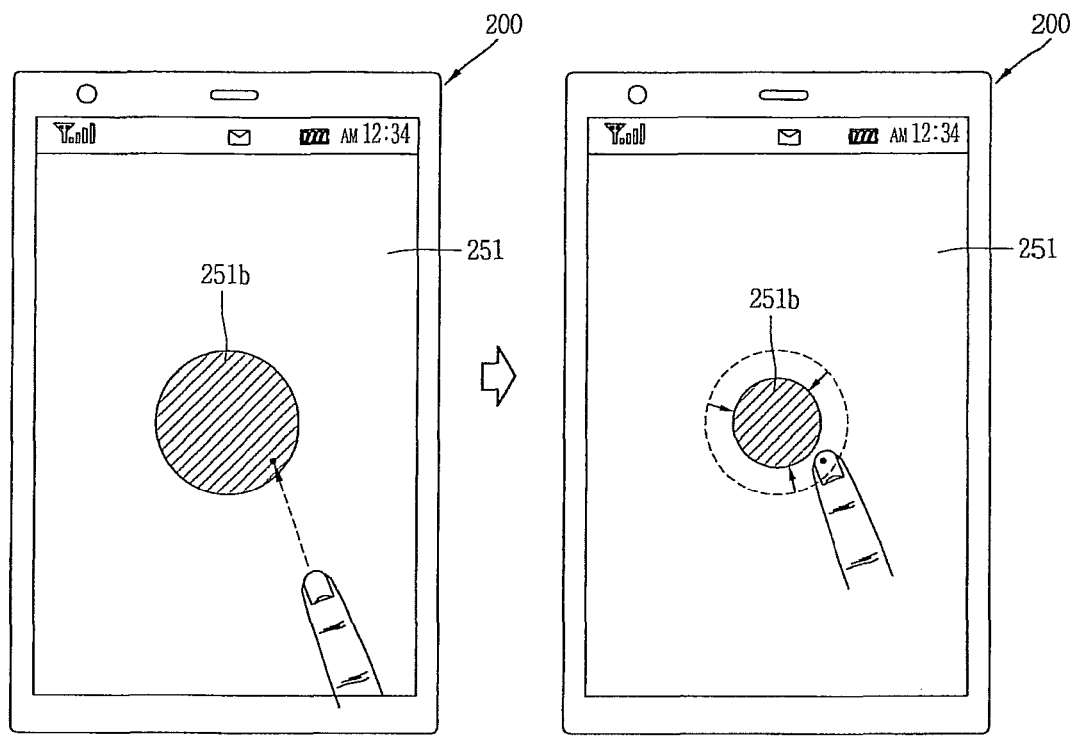
FIGS. 3A and 3B are conceptual views illustrating another operation example of a mobile terminal according to the present invention.
Figure 3B:
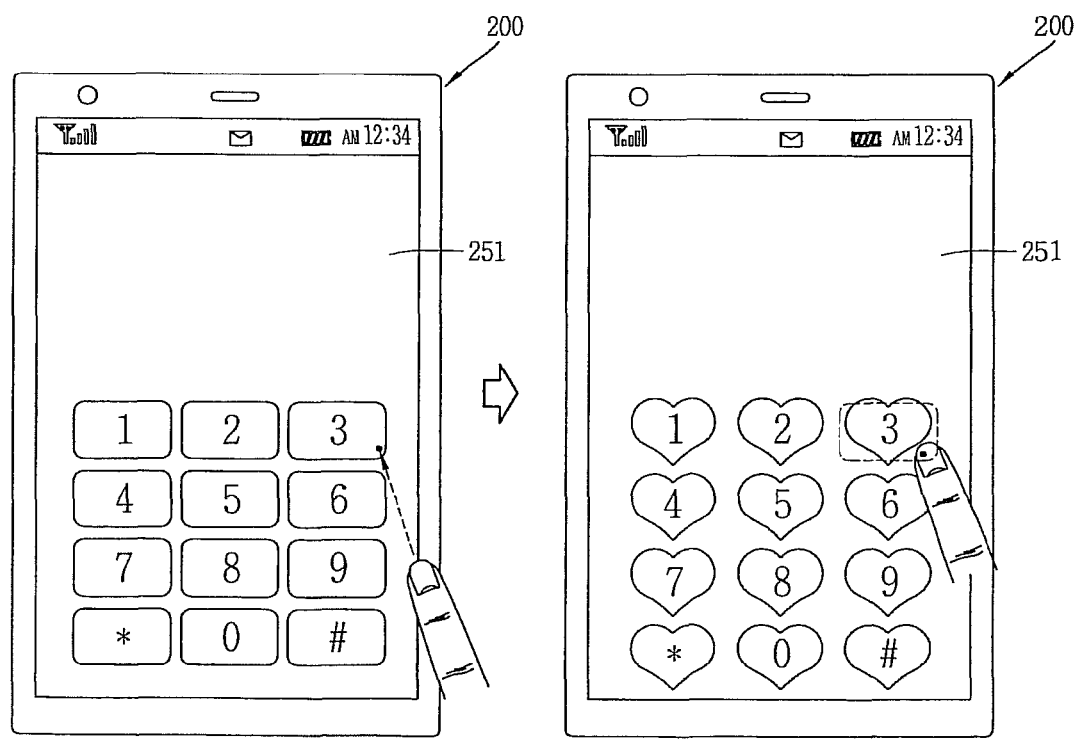

FIGS. 3A and 3B are conceptual views illustrating another operation example of a mobile terminal according to the present invention.

FIG. 3A illustrates a shape change of the icon 251b according to time. For instance, a size of the icon 251b is changed. Even a user has tried to touch the icon 251b having the original size, the substantial touch point may correspond to a region outside the icon 251b due to a size change of the icon 251b.

More concretely, once a size of the icon 251b is reduced, a touch region is also reduced. Upon detection of touch on the reduced touch region, the mobile terminal determines the touch as selection for the icon 251b. On the other hand, is upon detection of touch on a region included in the original touch region, the mobile terminal determines according to a preset compensation method whether the icon 251b is selected or not in correspondence to the touch.

Once touch on the display unit 251 is detected during changes of positions or shapes of objects with respect to a touch input, the mobile terminal 200 determines which object among the objects is selected in correspondence to the touch. Under this configuration, a touch input (or touch point) detected while the objects are moving may be compensated. Hereinafter, compensation for this touch input (or touch point) and a user interface using the same will be explained in more details.

FIG. 3B is a view showing that a virtual keyboard having a plurality of keys is changed. If a key input is performed while sizes or shapes of the plurality of keys are changed, the mobile terminal determines a key of the plurality of keys to which the input corresponds. More concretely, a control command corresponding to a key input through touch is compensated. In this case, the control command may be also compensated based on one of a touch duration, a touch point and a change of the touch point.

Figure 4:
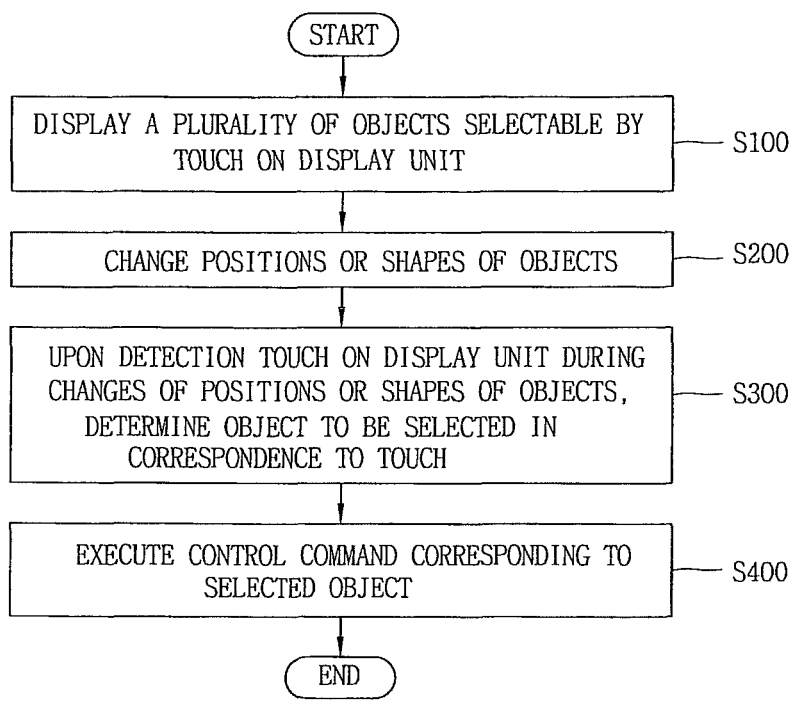
FIG. 4 is a flowchart illustrating a control method applicable to the mobile terminal of FIGS. 2, 3A and 3B.

FIG. 4 is a flowchart illustrating a control method applicable to the mobile terminal of FIGS. 2, 3A and 3B, FIG. 5 is a flowchart illustrating one embodiment of a touch input implemented by the control method of FIG. 4, FIGS. 6A to 6D are conceptual views illustrating another embodiment of a touch input implemented by the control method of FIG. 4, and FIGS. 7A to 7D are conceptual views illustrating still another embodiment of a touch input implemented by the control method of FIG. 4.

Referring to FIG. 4, a plurality of objects which can be selected in a touch manner are displayed on the display unit of the mobile terminal (S100).

The objects are subjects which undergo a touch input, which indicate graphic objects displayed on the display unit.

Here, the graphic objects mean all types of objects which can be visually displayed on a screen, such as texts, icons, images, moving images and UI components (buttons, menus, etc.).

The objects may be icons of stereoscopic images, or may be parts of the icons. For instance, the objects may be icons, and the icon may be a polyhedron implemented as a stereoscopic image. Here, each surface of the polyhedron is selected in a touch manner.

Next, positions or shapes of the objects are changed (S200). This change may be performed by the controller. For instance, the objects may perform motions such as sliding and rotation (refer to FIG. 2), or may have sizes changed real time (refer to FIG. 3A), or may have shapes changed real time. Alternatively, this change may be set by a user, or may be executed by an application transmitted through the internet.

In the step of changing (S200), a relative position of a user's reference portion with respect to the display unit is detected. And, the positions or the shapes of the objects are changed according to a change of the relative position.

Upon detection of touch on the display unit while positions or shapes of the objects are changed, it is determined which object among the objects is to be selected in correspondence to the touch (S300). Finally, a control command corresponding to a selected object is executed (S400). Under this process, touch may be recognized more precisely.

A touch input with respect to moving objects may not be precisely recognized. Accordingly, even if a user's touch is performed on a region having no objects, one of the objects may be selected.

For instance, in the step of determination (S300), when a touch duration is more than a preset reference value, a user's touch is determined as selection for an object positioned on a touch point on the display unit. More concretely, if the touched state is released after a predetermined time lapses, the operation is considered as an intentional operation. Accordingly, a touch time is set as a reference for touch recognition. In this case, upon touch of the display unit, an object positioned on a touch point may be highlighted.

Figure 5:
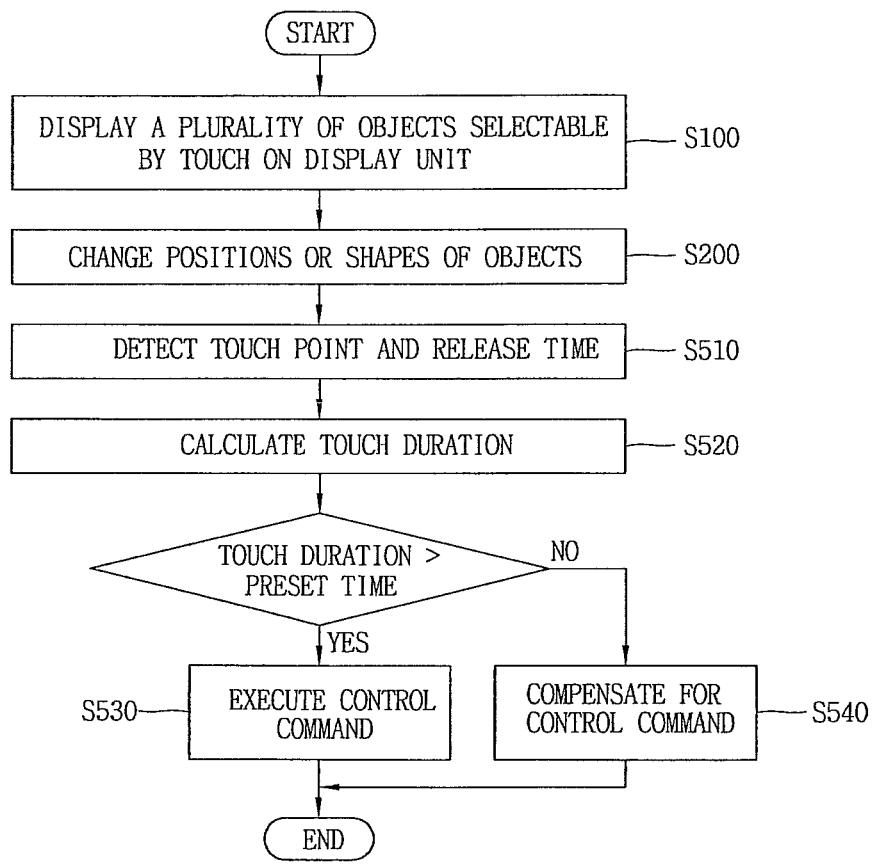
FIG. 5 is a flowchart illustrating one embodiment of a touch input implemented by the control method of FIG. 4.

Referring to FIG. 5, a control command is compensated when the touch duration is less than a preset time, but is not compensated when the touch duration is more than the preset time.

More concretely, once a user's touch is input while positions or shapes of objects are changed, a touch time and a release time are detected (S510) thereby to calculate a touch duration (S520). If the touch duration is more than a preset value, touch compensation is not performed, but a control command is executed (S530).

If the touch duration is less than the preset value (i.e., touched state is instantaneously released), the release is considered as an unintentional motion thus to compensate for a control command (S540). For instance, the control command may not be executed, or a command corresponding to an object nearest to a touch point may be executed.

As another example, in the step of determination (S300), upon detection of a drag operation consecutive with the touch, the operation is determined as selection for an object adjacent to a touch point in a drag direction among the objects. More concretely, a user touches the display unit while positions or shapes of the objects are changed, and then performs a drag operation towards his or her desired object. If these consecutive operations are input, the controller determines these operations as selection for an object adjacent to the touch point in a drag direction among the objects by the user. Then, the controller executes a corresponding control command.

The aforementioned compensation method may be determined by a user's preset information. More concretely, the mobile terminal is configured to receive a user's information, e.g., an age, a sex, a race, a weight, a finger size, etc. And, the control command may be executed based on the user's preset information.

For instance, in the aspect of an age, touch by an old man is slower than touch by a young man. Accordingly, a compensation method is differently set according to an age. More concretely, a reference time (the preset time) with respect to touch by an old man is set to be longer than that by a young man.

Figure 6A:
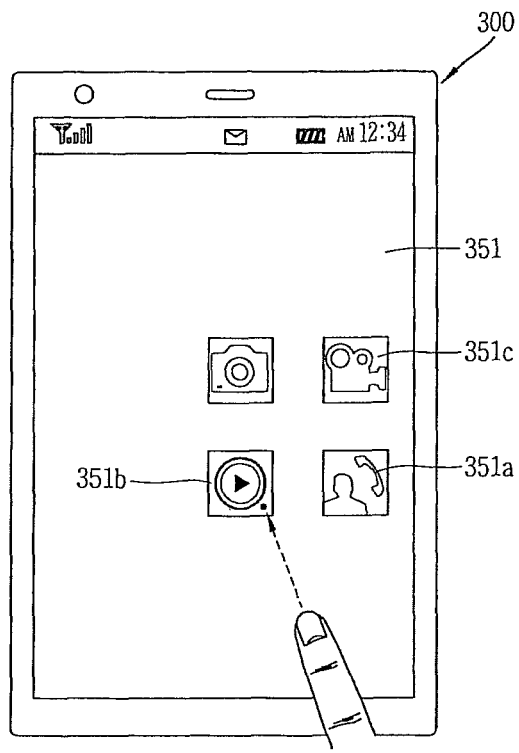
FIGS. 6A to 6D are conceptual views illustrating another embodiment of a touch input implemented by the control method of FIG. 4.
Figure 6B:
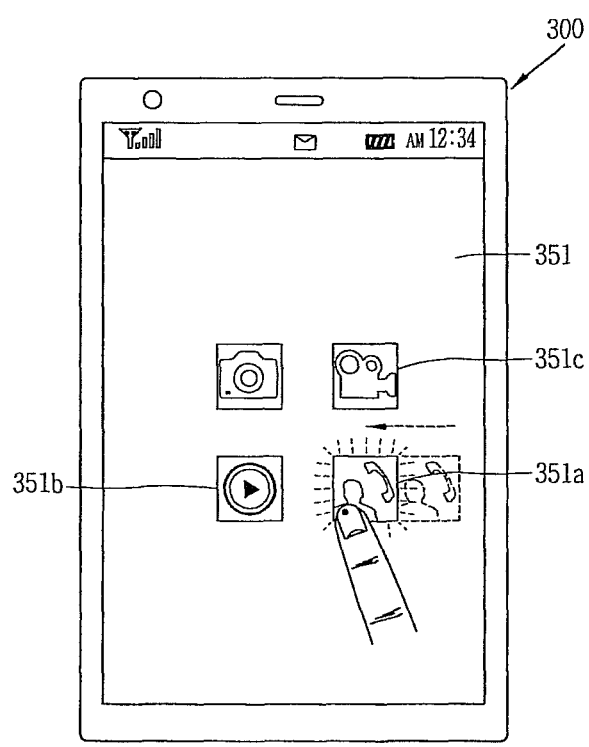

Referring to FIG. 6A, icons are displayed on a display unit 351. Referring to FIG. 6B, the icons are moveable. Once a user touches one icon 351a of the icons (refer to FIG. 6B), the touched icon 351a is highlighted. If the user releases the touched state, the highlighted icon 351a is selected. More concretely, the touched icon 351a which is to be selected for the touch duration is highlighted. As the touched state is released, an application connected to the touched icon 351a or a specific mode (e.g., a video call mode) is executed.

Figure 6C:
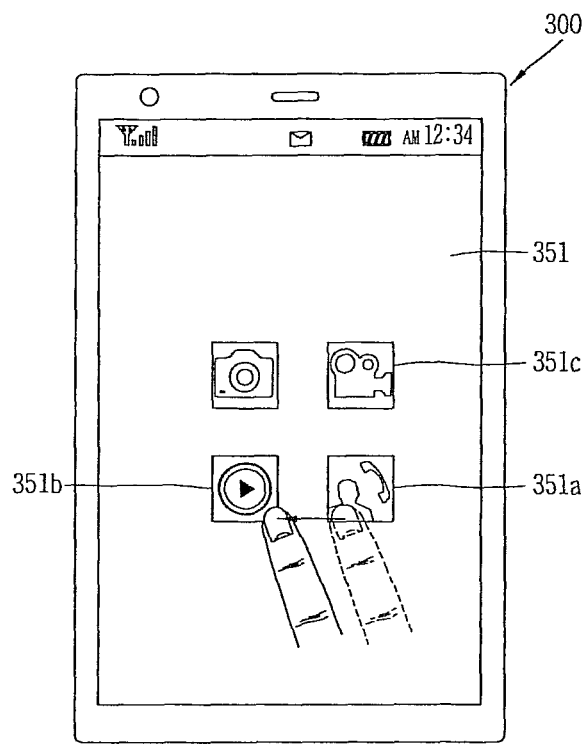
Figure 6D:
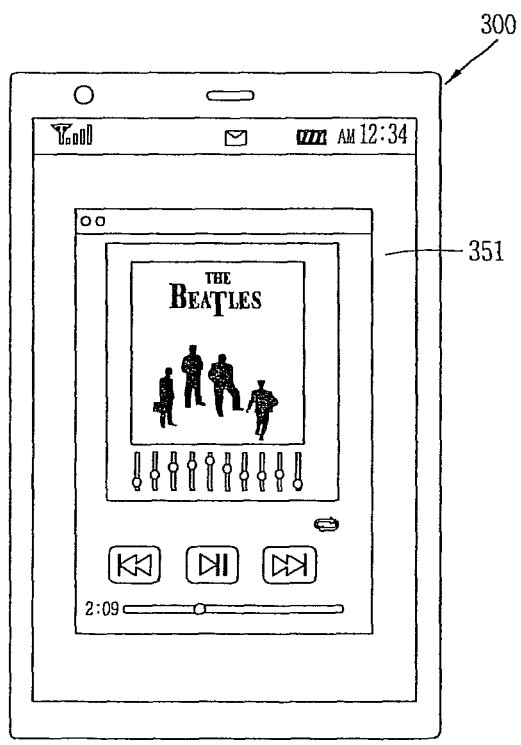

Referring to FIG. 6C, if the highlighted icon 351a is not a user's desired icon, the user drags a screen of the display unit towards a desired icon 351b. Upon detection of a drag operation consecutive with the user's touch, the controller 180 (refer to FIG. 1) of the mobile terminal determines the drag as selection for the icon 351b adjacent to a touch point in a drag direction. Then, the controller 180 executes a control command corresponding to the icon 351b adjacent to the touch point. Referring to FIG. 6D, a music playing application corresponding to the icon 351b adjacent to the touch point is executed by the touch and drag operation.

The drag may be executed in any direction, e.g., upper, lower, right and left directions. For instance, when the user performs a drag operation towards an upper direction in FIG. 6C, a moving image playing application corresponding to an icon 351c positioned at an upper side may be executed.

Figure 7A:
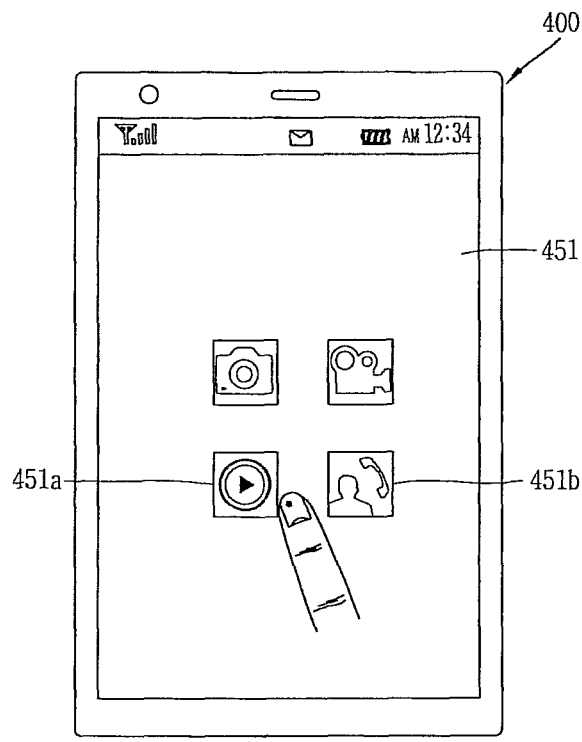
FIGS. 7A to 7D are conceptual views illustrating still another embodiment of a touch input implemented by the control method of FIG. 4.
Figure 7B:
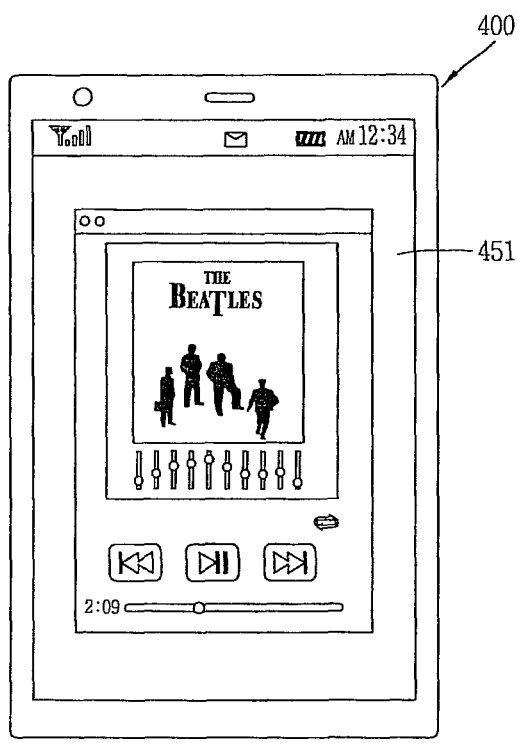
Figure 7C:
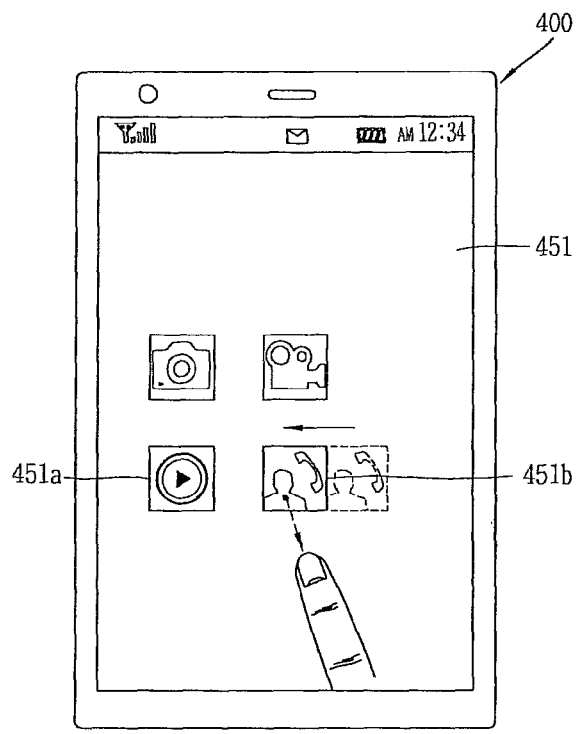
Figure 7D:
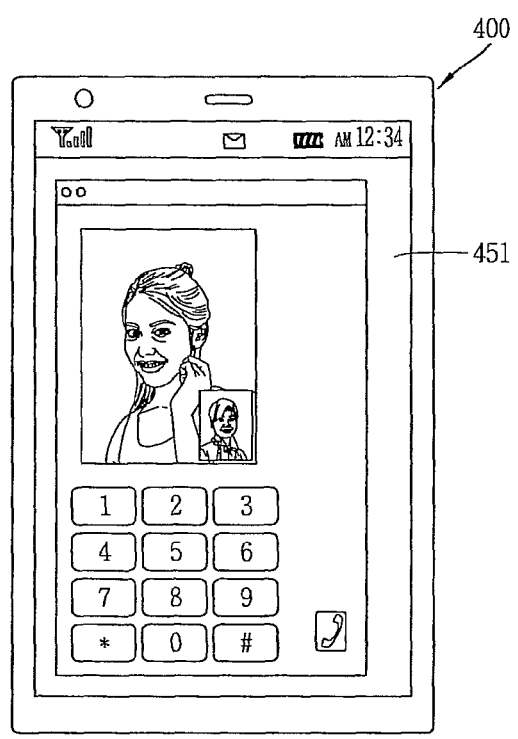

Referring to FIGS. 7A and 7B, when the icon exists on the touch point for a touch duration, the controller 180 (refer to FIG. 1) of the mobile terminal determines the touch as selection for the icon. On the other hand, when the icon does not exist on the touch point, the controller determines the touch as selection for an icon adjacent to the touch point.

As shown in FIG. 7A, in a case that no icon is touched at the time of a user's touch, if the user's touched state is released, an icon 451a adjacent to a touch point is selected as shown in FIG. 7B. Then, a playing application corresponding to the selected icon 451 is executed. However, if an icon 451b reaches the touch point due to movements of icons before the user's touched state is released, a video call mode corresponding to the icon 451b is executed (refer to FIG. 7D). Here, an icon to be selected by the touch for a touch duration may be highlighted.

So far, a case to process a user's input when the user is in a fixed state was explained. Hereinafter, a case to process a user's input when the user is in a moveable state will be explained in more details.

Figure 8:
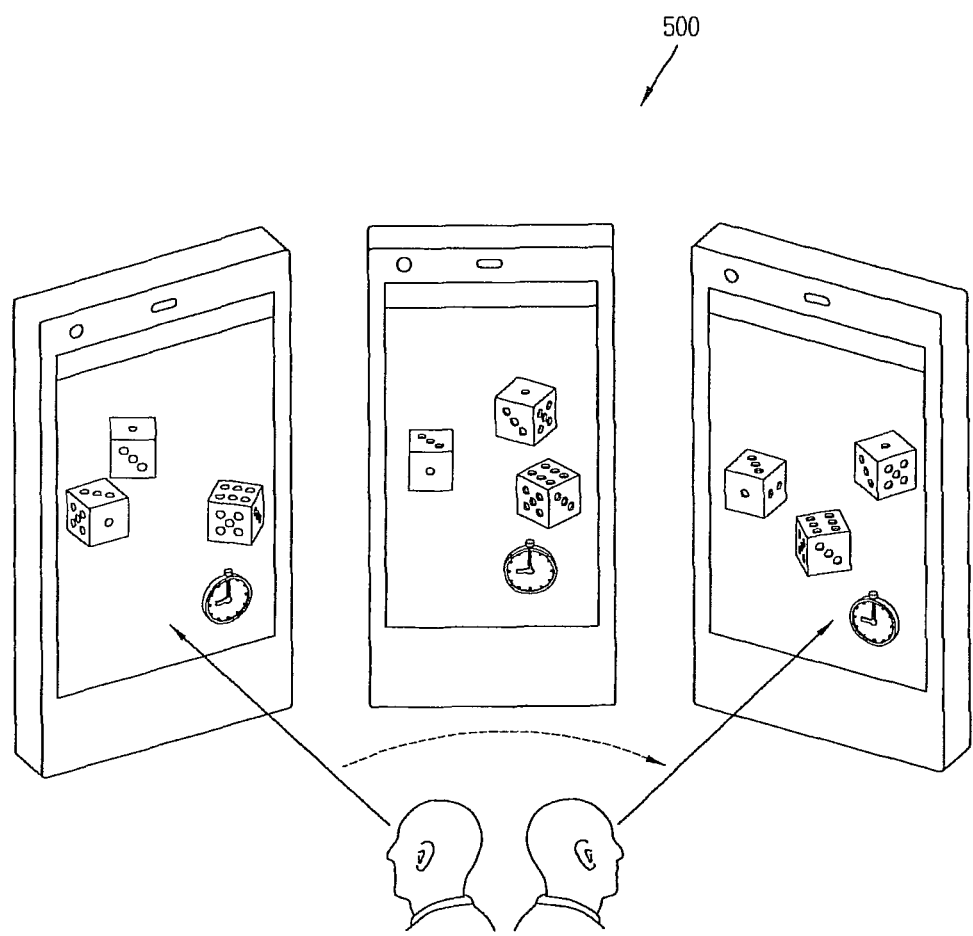
FIG. 8 is a conceptual view illustrating still another operation example of a mobile terminal according to the present invention.

FIG. 8 is a conceptual view illustrating still another operation example of a mobile terminal 500 according to the present invention.

Firstly, the mobile terminal 500 detects a user's movement. Then, according to the movement, the mobile terminal 500 changes images on a screen or changes positions or shapes of icons, objects to be input in a touch manner.

A sensing unit (not shown) for sensing a user's movement is mounted to the body. The sensing unit detects a relative position of a user's reference portion with respect to the display unit. Positions or shapes of images and icons may be changed in correspondence to a change of the relative position.

The sensing unit may be configured to sense a movement of the reference portion based on the body. For instance, the sensing unit may be implemented as a supersonic sensor, a camera, a proximity sensor, an infrared ray sensor and so on. And, the user's reference portion may be implemented as a user's head or eyes and so on. The sensing unit may be also configured to sense a tilted state of the body based on the reference portion. For instance, the sensing unit may be implemented as an acceleration sensor and so on. In this case, icons may be differently displayed according to a gradient of the mobile terminal.

A user's touch with respect to the mobile terminal includes selection for a three-dimensional stereoscopic image itself, and selection for a part of the three-dimensional stereoscopic image.

Here, the 3D stereoscopic image indicates an image for implementing depth and sense of reality with respect to an object placed on a monitor or a screen as if in a real space. This 3D stereoscopic image is implemented by using binocular disparity.

A 3D display method includes a stereoscopic method (glasses 3D), an auto-stereoscopic method (glasses-free 3D), a projection method (holographic 3D), etc. The stereoscopic method mainly applied to a home television receiver, etc. includes a Wheatstone stereoscopic method and so on. The auto-stereoscopic method mainly applied to a mobile terminal, etc. includes a parallax barrier method, a lenticular method and so on. The projection method includes a reflective holographic method, a transmissive holographic method and so on.

The icon may be configured as a part of a 3D thumbnail image. Generally, a thumbnail image indicates a contracted image or a contracted still image.

A 3D thumbnail image may create a left image thumbnail and a right image thumbnail from a left image and a right image of an original image frame. As the created left image thumbnail and a right image thumbnail are integrated, one 3D thumbnail image may be created. These created left and right image thumbnails are displayed on a screen with a distance difference in left and right directions, respectively, by depth corresponding to a time difference of a left image and a right image. This may implement stereoscopic space perception.

Referring to the drawings back, a user positioned at a left side of the mobile terminal views a left side of a stereoscopic image, whereas a user who has moved to a right side of the mobile terminal views a right side of the stereoscopic image.

If the user performs a touch input on the mobile terminal while moving, the touch input is executed during changes of positions or shapes of images and icons.

Once touch on the display unit 451 is detected during changes of positions or shapes of images and icons, the controller 180 (refer to FIG. 1) of the mobile terminal compensates for a control command corresponding to the touch based on a touch duration or a change of a touch point.

Figure 9:
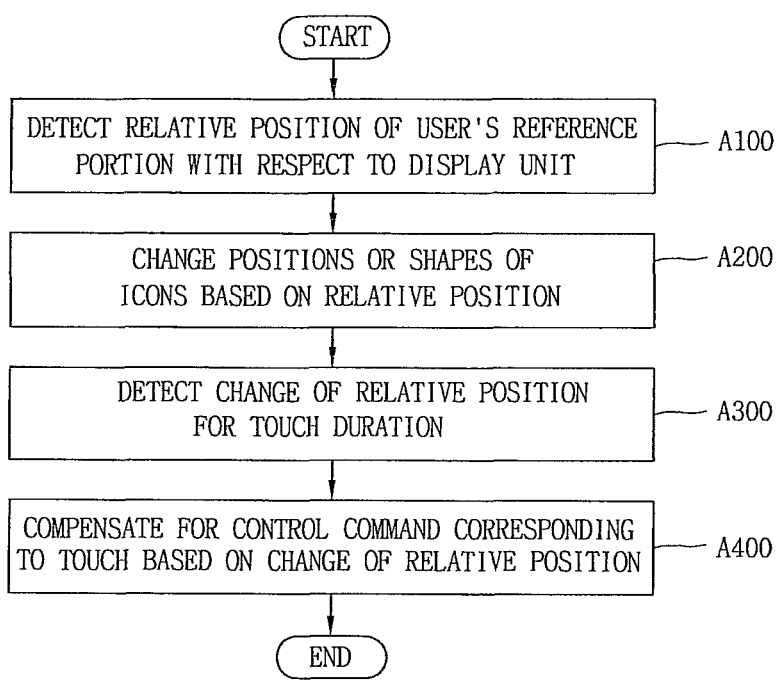
FIG. 9 is a flowchart illustrating a control method applicable to the mobile terminal of FIG. 8.
Figure 10:
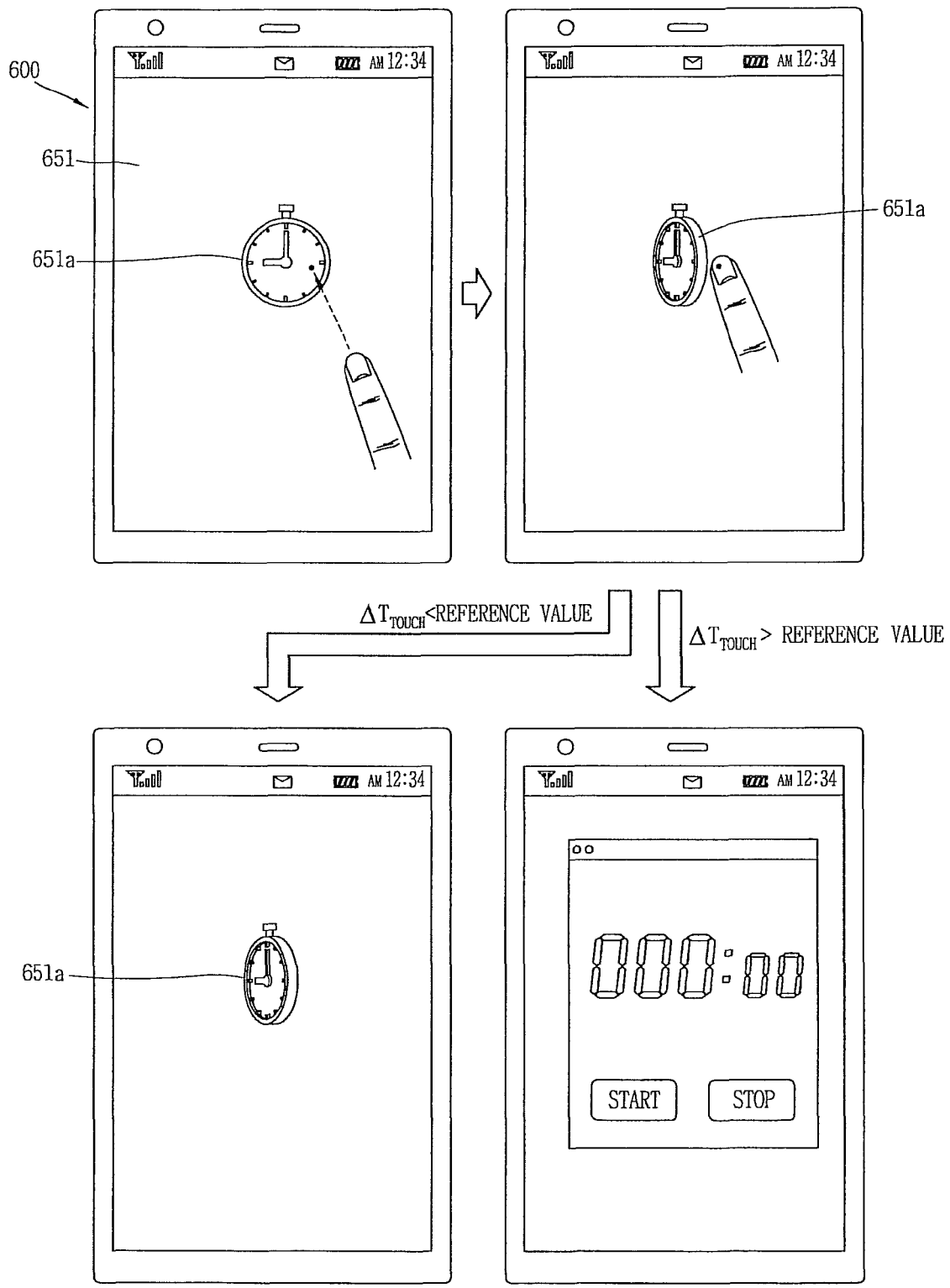
FIG. 10 is a conceptual view illustrating one embodiment of a touch input implemented by the control method of FIG. 9.

Hereinafter, compensating for a control command and a user interface using the same will be explained in more details. FIG. 9 is a flowchart illustrating a control method applicable to the mobile terminal of FIG. 8, and FIG. 10 is a conceptual view illustrating one embodiment of a touch input implemented by the control method of FIG. 9.

According to the control method of FIG. 9, a relative position of a user's reference portion with respect to the display unit is detected (A100).

In the step of detection (A100), a movement of the reference portion may be detected based on the body, or tilting of the body may be detected based on the reference portion. Then, a position or a shape of an icon is changed based on the detection of the relative position (A200).

For instance, a plurality of icons which can be selected by the touch are displayed on the display unit. And, positions or shapes of the plurality of icons are changed according to a movement of the reference portion.

More concretely, the mobile terminal provides a stereoscopic image to a user through head tracking, eye tracking, motion sensing, etc.

When head tracking is taken as an example, the controller of the mobile terminal real-time calculates a position of a subject (user) and a direction of the subject. Then, the controller real-time changes a screen of the display unit according to a change of the position of the subject or the direction of the subject. This may allow the user to view a stereoscopic image through a 2D screen. However, the present invention is not limited to this. That is, a 3D stereoscopic image may be displayed on the display unit, and may be real-time changed according to a change of a position of a subject or a direction of the subject.

According to the control method of FIG. 9, a change of the relative position is detected while touch on the display unit is maintained (A300). Based on the change of the relative position, a control command corresponding to the touch is compensated (A400).

In the step of compensation (A400), a control command corresponding to the touch is compensated based on a change of the relative position and a touch duration. The control command may not be processed when the change of the relative position is detected and when the touch duration is less than a preset time. On the other hand, the control command may be processed when the change of the relative position is detected and when the touch duration is more than the preset time.

Referring to FIG. 10, an icon 651a having a clock shape is displayed on a display unit 651 of a mobile terminal 600 so that a user can select a time watch mode. A shape of the icon 651a is changed according to the user's movement. In spite of the user's intention to touch the icon 651a, the user may touch a region rather than the icon 651a. In this case, when a touch duration is more than a reference value, the touch is determined as the user's intentional touch. As a result, a time watch mode corresponding to the icon 651a is executed. On the other hand, when the touch duration is less than the reference value, the touch is determined as the user's unintentional touch. As a result, the time watch mode corresponding to the icon 651a is not executed.

As another example, in the step of compensation (A400), when no icon exists on a touch point of the display unit for a touch duration, the touch may be determined as selection for an icon adjacent to the touch point.

As still another example, the step of compensation (A400) may include a step of highlighting and a step of determination. In the step of highlighting, when no icon exists on a touch point of the display unit for a touch duration, an icon adjacent to the touch point is highlighted. In the step of determination, whether an icon adjacent to the touch point is selected or not is determined based on information relating to touch release with respect to the touch point.

For instance, when touch release is performed at a region rather than the initial touch point (drag or flicking occurs), the controller of the mobile terminal selects an icon which exists on the region where the touch release is performed. If touch inputs are consecutively performed before touch release, selection for a highlighted icon is released. In the present invention, a user's intention with respect to a touch input may be precisely determined based on information relating to touch release.

In the mobile terminal and the method for controlling the same according to the present invention, touch recognition may be implemented more precisely by compensating for a touch input (or a touch point) detected while objects displayed on the display unit are moving.

Furthermore, in case of changing a display state of an icon according to tilting of the mobile terminal or a position of a user's eyes, an icon may be selected or may not be selected on the same touch point.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller of the mobile terminal.

The foregoing embodiments and advantages are merely exemplary and are not to be construed as limiting the present disclosure. The present teachings is can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a body;
a display unit disposed on one surface of the body, displaying one or more icons thereon, and the display unit configured to have a touch input thereon; and
a controller operatively connected to the body and the display unit, and the controller configured to:
display an icon on a first display area of the display unit;
change a position or a shape of the icon, wherein the icon is displayed on a second display area based on the change of the position or the shape of the icon;
detect a touch applied to the display unit to select the icon;
compensate, when the touch is applied on the first display area after the icon is displayed on the second display area, for a control command corresponding to the touch applied on the first display area based on at least one of a touch duration, a touch point and a change of the touch point related to the touch, such that the control command is related to the icon displayed on the second display area, and
execute a function related to the icon displayed on the second display area based on the compensated control command for the touch applied on the first display area.

2. The mobile terminal of claim 1, further comprising:
a sensing unit mounted to the body, and the sensing unit configured to sense a relative position of a user's reference portion with respect to the display unit,
wherein the change of the position or the shape of the icon is performed in correspondence to a change of the relative position.

3. The mobile terminal of claim 2, wherein the sensing unit changes a touch area from the first display area to the second display area based on the change of the position or the shape of the icon.

4. The mobile terminal of claim 2, wherein the sensing unit detects a movement of the reference portion based on the body, or the sensing unit to detect tilting of the body based on the reference portion.

5. The mobile terminal of claim 1, wherein the control command is compensated when the touch duration is less than a preset time, but control command is not compensated when the touch duration is more than the preset time.

6. The mobile terminal of claim 1, wherein upon detection of a drag operation consecutive with the touch, the controller executes a function related to an icon adjacent to a touch point in a drag direction.

7. The mobile terminal of claim 6, wherein an icon to be selected by the touch for a touch duration is highlighted on the display unit.

8. The mobile terminal of claim 1, wherein the controller determines the touch as selection of the icon on the first display area, when the icon exists on the first display area for the touch duration,
wherein the controller determines the touch as selection of an icon different from the icon on the first display area, when the icon on the first display area moves to the second display area,
wherein the icon on the first display is an icon adjacent to the touch point.

9. The mobile terminal of claim 1, wherein the icon is an icon of a stereoscopic image, and the control command corresponding to the touch includes selection of the icon of the stereoscopic image itself and selection for a part of the icon of the stereoscopic image.

10. The mobile terminal of claim 1, wherein the control command is compensated based on a user's preset information.

11. A method for controlling a mobile terminal which that implements a touch input on a display unit, the method comprising:
displaying an object from among one or more objects on a first display area of a display unit, the object being selectable by touch;
changing a position or a shape of the object, wherein the object is displayed on a second display area based on the change of the position or the shape of the object;
detecting a touch applied to the icon displayed on the first display area or the second display area;
compensating, when the touch is applied on the first display area after the icon is displayed on the second display area, for a command corresponding to the touch applied on the first display area, based on at least one of a touch duration, a touch point and a change of the touch point related to the touch, such that the control command is related to the icon displayed on the second display area; and
executing a function related to the icon displayed on the second display area based on the compensated control command for the touch applied on the first display area.

12. The method of claim 11, wherein in the compensating, upon detection of a drag operation consecutive with the touch, the operation is determined as selection of an object adjacent to a touch point in a drag direction among the objects.

13. The method of claim 11, wherein in the compensating, when a touch duration exceeds a preset reference value, the touch is determined as selection of an object positioned at a touch point on the display unit.

14. The method of claim 11, wherein in the changing, a relative position of a user's reference portion with respect to the display unit is detected, and the position or the shape of the object is changed according to a change of the relative position.

15. The method of claim 11, wherein the objects are icons of stereoscopic images, or are parts of the icons.

16. A method for controlling a mobile terminal that implements a touch input on a display unit, the method comprising:
outputting an icon of one or more icons on a first display area of the display unit;
sensing a relative position of a user's reference portion with respect to the display unit;
sensing a change of the relative position for a touch duration on the first display area;
changing a position or a shape of the icon based on the change of the relative position;
compensating for a control command corresponding to the touch based on at least one of a touch duration, a touch point and a change of the touch point related to the touch; and
executing a function related to the icon based on the compensated control command for the touch on the display unit.

17. The method of claim 16, wherein in the sensing, a movement of the reference portion is detected based on the mobile terminal, or tilting of the mobile terminal is detected based on the reference portion.

18. The method of claim 16, wherein when the change of the relative position is detected and the touch duration is less than a preset time, the control command is not processed,
wherein when the change of the relative position is detected and the touch duration is more than the preset time, the control command is processed.

19. The method of claim 16, wherein in the compensating, when no icon exists on a touch point of the display unit for the touch duration, the touch is determined as selection of an icon adjacent to the touch point.

20. The method of claim 16, wherein the compensating includes:
when no icon exists on a touch point of the display unit for the touch duration, highlighting an icon adjacent to the touch point; and
determining whether the adjacent icon is selected or not, based on information relating to touch release with respect to the touch point.

* * * * *